Patented Apr. 13, 1943

2,316,291

UNITED STATES PATENT OFFICE 2,316,291

PROCESS FOR RETOUCHING OF SUBTRACTIVE MULTICOLOR IMAGES

Wilhelm Schneider, Dessau, and Gustav Wilmanns, Wolfen, Kreis Bitterfeld, Germany, assignors to General Aniline & Film Corporation, New York, N. Y., a corporation of Delaware No Drawing. Application January 18, 1940, Serial No. 314,448. In Germany January 18, 1939

1 Claim. (Cl. 95—2)

This invention relates to the retouching of photographic subtractive multicolor images. In some cases it is desirable to retouch subtractive multicolor images, obtained for instance by color development of a plurality of silver halide emulsion layers, in order to remove wrong color tinges or color spots, also in order to correct the color value of certain objects which though objectively correct, are not satisfying from an aesthetical view point. For that purpose a great number of various dyestuffs are necessary in order to meet the needs of every case. Some dyestuffs however possess such a small spectral range, that it is impossible, to predict, how the retouching dyestuffs will show together with the dyestuffs of the emulsion layer. This is especially true in reflected light, for instance with paper images, where reflection-color and transparency-color are mixed together inextricably. A dyestuff for instance, the maximum of which lies at about 600–650 m$\mu$ and which is of blue color, will never form "green" together with the yellow dyestuffs already in the emulsion layer, but will yield only blackish color values.

It has been found that these difficulties can be absolutely avoided, if for retouching subtractive multicolor images, especially on multicolor photographic material, dyestuffs are used which correspond completely or approximately in regard to their spectral absorption to the image dyestuffs in the emulsion layers produced therein by color development and which are taken up by the photographic layers in a transparent form. The absorption maxima of the retouching dyestuffs corresponding to the image dyestuffs lie in a region of about 450 m$\mu$ for yellow, 550 m$\mu$ for purple and 670 m$\mu$ for red. Also mixtures may be prepared from these dyestuffs for red, green and blue color values. Furthermore dyestuffs may be used with two absorption maxima corresponding to those of the dyes in the emulsion layers.

Suitable dyestuffs for retouching may be found in nearly all dyestuff groups, for instance azodyestuffs, especially for yellow and purple color tones, the xanthene-dyestuffs, triphenylmethane-dyestuffs, oxazines, thiazines and azines which yield particularly purple and blue-green color tones.

It is advisable to use for retouching, dyestuffs with the same constitution as those in the emulsion layers used for building up the color image. This conformity may be complete or restricted to the auxochrome groups. This has the advantage that the dyestuffs react under the influence of light or chemicals in exactly the same way as the image dyestuffs, so that, if changes occur caused by chemicals or light, the retouching never becomes visible. Furthermore when dyestuffs of the same absorption as the image dyestuffs are used, the general impression of the multicolor image remains the same in daylight as in artificial light.

The subtractive multicolor images to be retouched according to this invention may be obtained by different processes, for instance by colored development according to U. S. Patents 2,178,612, 2,179,228, 2,179,239, 2,179,244 and 2,186,849.

If the image dyestuffs in the emulsion were obtained by color development from diffusion-free dyestuff components, it is not only unnecessary, but even undesirable to use a retouching dyestuff with a radical of diffusion-free characteristics, since such a dyestuff cannot penetrate into the colloidal layer and consequently will cause splotches.

To substitute the retouching dyestuffs with groups of little significance or to omit a substituent existing in the dyestuffs of the emulsion layers, is immaterial, as long as it does not influence color, color-fastness or stability towards chemicals.

The process of the present invention is suitable for the retouching of negative and positive images as transparencies and in reflected light and also paper images.

Example I

A blue retouching dyestuff is obtained in the following manner: $\frac{1}{10}$ of a mol of $\alpha$-hydroxynaphthoic acid and 28 grams of sodium hydroxide are dissolved in 100 cc. of water. To this solution $\frac{1}{10}$ of a mol of diethyl-p-phenylendiamine-hydrochloride in water is added. While cooling and stirring $\frac{1}{10}$ of a mol of potassium ferricyanide is slowly added. After a short time the dyestuff crystallizes in fine needles. The precipitation is completed by adding a saturated solution of common salt. The dyestuff is then sucked off and purified by extraction with methanol. Deep-dark crystals with purple surface luster are obtained which are soluble in water with blue color.

Example II

A yellow retouching dyestuff is obtained in the following manner: $\frac{1}{10}$ of a mol of m-aminobenzoylacetanilide-p-carboxylic acid is condensed with diethyl-p-phenylendiamine in the same way as described in Example I. An ocher colored dyestuff powder is obtained which is soluble in water with a yellow color.

*Example III*

A purple retouching dyestuff is obtained in the following way: 1/10 of a mol of 1-β-naphthyl-3-methyl-5-pyrazolone-4',8'-disulfo acid is condensed with diethyl-p-phenylendiamine according to Example I. A nearly black crystalline powder is obtained which is soluble in water with a red color having a blue tinge.

The retouching dyestuffs of the preceding examples are for instance very well suited for the retouching of a subtractive multicolor image obtained by color development of a photographic multilayer material, which contains in the blue sensitized layer as the dye-forming component a diffusion-free derivative of m-aminobenzoyl-acetanilide-p-carboxylic acid, in the green sensitized layer a diffusion-free derivative of 1-β-naphthyl-3-methyl-5-pyrazolone-4',8'-disulfo acid and in the red sensitized emulsion layer a diffusion-free derivative of α-hydroxynaphthoic acid.

We claim:

In a process for retouching photographic subtractive multi-color images on photographic multi-layer material wherein said images comprise yellow, magenta and blue-green color developed dyes, the image dyestuffs containing in their molecule at least one radical effecting fastness to diffusion, the improvement which comprises the use of transparent retouching dyestuffs exhibiting a spectral absorption corresponding substantially to that of said image dyestuffs and containing in their molecule auxochrome groups corresponding to those of one of said image dyestuffs and no radical effecting fastness to diffusion said dyestuff for retouching the blue-green image layer being the reaction product of α-hydroxy naphthoic acid with the oxidation products of diethyl-p-phenylendiamine, said dyestuff for retouching the magenta image layer being the reaction product of 1-β-naphthyl-3-methyl-pyrazolone-4'·8-disulfo· acid with the oxidation products of diethyl-p-phenylendiamine and the dyestuff for retouching the yellow image layer being the reaction product of m-aminobenzoylacetanilide-p-carboxylic acid with the oxidation products of diethyl-p-phenylendiamine.

WILHELM SCHNEIDER.
GUSTAV WILMANNS.